United States Patent [19]
Yamamoto et al.

[11] Patent Number: 5,692,146
[45] Date of Patent: Nov. 25, 1997

[54] METHOD OF IMPLEMENTING FAST 486TM MICROPROCESSOR COMPATIBLE STRING OPERATIONS

[75] Inventors: Wayne Yamamoto, San Jose; Narendra Sankar, Sunnyvale; Mario Nemirovsky, San Jose, all of Calif.

[73] Assignee: National Semiconductor Corporation, Santa Clara, Calif.

[21] Appl. No.: 451,742

[22] Filed: May 26, 1995

[51] Int. Cl.$^6$ .............................. G06F 9/26; G06F 9/32; G06F 12/00; G06F 12/02
[52] U.S. Cl. .................... 395/410; 395/427; 395/481; 395/181.1; 395/182.13; 395/184.01; 395/185.01; 395/375
[58] Field of Search ................................ 395/410, 725, 395/375, 427, 481, 181.1, 182.13, 185.01, 184.01, 733

[56] References Cited

U.S. PATENT DOCUMENTS

| | | | |
|---|---|---|---|
| 5,189,319 | 2/1993 | Fung et al. | 326/86 |
| 5,204,953 | 4/1993 | Dixit | 395/421.1 |
| 5,254,888 | 10/1993 | Lee et al. | 327/298 |
| 5,259,006 | 11/1993 | Price et al. | 375/356 |
| 5,274,826 | 12/1993 | Kardach et al. | 395/725 |
| 5,404,473 | 4/1995 | Papworth et al. | 395/588 |
| 5,408,626 | 4/1995 | Dixit | 395/421.1 |
| 5,497,468 | 3/1996 | Tani et al. | 395/375 |

OTHER PUBLICATIONS

Serra, Micaela & Dervisoglu, Bulent I, "Testing", Chapter 79, *The Electrical Engineering Handbook*, Richard C. Dorf, Editor-in-Chief, pp. 1808–1837, CRC Press.

L-T Wang et al., "Feedback Shift Registers For Self-Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power–On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh K., *80×86 Architecture and Programming, vol. II: Architecture Reference*, Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A-4, 8237A-5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc.

Hennessy, John, et al., "Interpreting Memory Addresses", *Computer Architecture A Quantitative Approach*, pp. 95–97, Morgan Kaufmann Publishers, Inc. 1990.

(List continued on next page.)

*Primary Examiner*—David K. Moore
*Assistant Examiner*—Than V. Nguyen
*Attorney, Agent, or Firm*—Limbach & Limbach L.L.P.

[57] ABSTRACT

An efficient method for implementing string operations used to process blocks of data within a memory. The registers used to track the memory addresses are updated and committed before the outcome of a read or write address operation is known. In the event an exception occurs, exception handling hardware and microcode is used to restore the state of the registers to the condition they were in prior to the iteration which produced the exception. This reduces the number of microcode instructions required to implement the string operation, producing a faster cycling of the code through multiple iterations. The result is a more optimal code for string operations and a decrease in the time required to carry out the string instruction.

8 Claims, 1 Drawing Sheet

OTHER PUBLICATIONS

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32.

FIG. 1

METHOD OF IMPLEMENTING FAST 486TM MICROPROCESSOR COMPATIBLE STRING OPERATIONS

TECHNICAL FIELD

The present invention relates to string operations used by a microprocessor to process blocks of data within memory, and more specifically, to a method of processing such data blocks which is more efficient than the one currently utilized in many state of the art microprocessors.

BACKGROUND OF THE INVENTION

A microprocessor often executes data processing functions in which large blocks of data are processed together. An instruction known as a "string" operation is commonly used to accomplish this data processing, where such operations occur frequently in both system and applications code. Examples of string operations are those used to transfer a block of data from one memory location to another, to store a block of data in memory, or to compare the contents of two blocks of data stored in memory.

An example of a typical set of string operations is that implemented by the Intel 486™ microprocessor. In the Intel 486™ instruction set, string operations are specified in a single instruction by combining a string instruction with a repeat operator and a repeat prefix. The repeat prefix determines the number of times the string operation microcode is executed, and the repeat operator instructs the processor to repeat the instruction to which it is attached. This format permits the string operation to be executed faster than it would be if executed within a multiple instruction software loop. The Intel 486™ string instructions and a brief description of their function are shown below in Table 1:

TABLE 1

| String Instruction | Description Function |
|---|---|
| CMPS | Compare operands for two different strings |
| LODS | Load string operand into accumulator register |
| MOVS | Move data from string to string |
| SCAS | Compare string data to accumulator value |
| STOS | Store string data in memo |

The Intel 486™ microprocessor resources are controlled by means of data contained in several sets of registers. The general register set, or application registers, consists of general purpose registers, segment registers, and an instruction pointer and flag register. The general purpose registers contain arithmetic and logical instruction operands. The segment registers contain segment selectors that identify the regions into which the memory is partitioned and point to tables stored in memory which contain the base address of each segment. The instruction pointer and flag register contains a pointer to the next instruction to be executed and a flag which indicates the status of the processor after execution of an instruction.

Several of the general purpose registers are dedicated to specific functions which are used in implementing a string instruction. The (E)CX register tracks the count or number of repetitions of the string instruction, while the (E)SI and (E)DI registers contain the source index and destination index values, respectively. These values are used in conjunction with the memory segment register values to indicate the source and destination operands (memory addresses) for the string instruction. When these registers are used in a string operation, their values are automatically incremented or decremented after each iteration. The DS and ES segment registers are used in executing a string instruction and contain data used by the processor to determine which segment(s) of the memory are accessed when executing the instruction.

During a string operation, the specified instruction is repeated n times, where n is the numerical value contained in the (E)CX register of the micro-processor. For example, to move a string of 8 bytes of data, a byte at a time, from memory location DS: 100 (location 100 in memory segment DS) to location ES:200 (location 200 in memory segment ES), the SI register would be set to 100, the DI register would be set to 200, and the CX register to 8. The REP MOVSB instruction would then be used to move the data, where the REP instruction causes the appended instruction to repeat while the E(CX) register is not equal to zero. On each iteration of the instruction, the SI and DI registers are incremented and the CX register is decremented. The instruction is repeated until the CX register is decremented to zero. After the instruction is completed, the value of the SI register is 108, the value of the DI register is 208, and the value of the CX register is 0.

The method steps used to implement the REP MOVS instruction in an Intel 486™ architecture, and a description of the function carried out by each step are shown below:

| Step | Function |
|---|---|
| 1) temp0 = memory [DS:SI] | read from source address |
| 2) memory [ES:DI] = temp0 | write source to destination address |
| 3) SI++ | move source pointer to next word |
| 4) DI++ | move destination pointer to next word |
| 5) CX— | decrement CX counter |
| 6) If CX > 0, then Go To 1), else end. | check if done if not done, continue if done, end. |

In the above list of steps, the memory address [DS:SI] indicates a memory location in memory segment DS, with address index stored in register SI. Similarly, the memory address [ES:DI] indicates a memory location in memory segment ES, with address index stored in register DI. Note that the address used to access the memory for the read or write operation (steps 1 or 2) is based on the register values set during the previous iteration.

A characteristic of the Intel 486™ micro-processor is that either the memory read or memory write operation can result in a limit exception if the address value to be accessed (found from the initial address plus the pointer increments occurring during the previous iterations) exceeds the segment limit. The segment limit is the amount of memory space available at that segment and address location. If a limit exception or an interrupt occurs, the SI, DI, and CX registers need to contain the same values as before the interrupted iteration started, in order to be able to properly execute the string operation when control is returned to the execution stage of the microprocessor.

One way to achieve this result is to update the SI, DI, and CX registers only after the memory read and write operations (which are based on the address calculations resulting from incrementing the registers), as is shown in the steps above. This prevents the registers from being updated until the system has successfully executed the read and write operations based on the previous iterations. If an exception or interrupt occurs during a read or write step, then the registers will not have been updated and will contain the appropriate values for that iterative cycle when control is returned and the read or write step is again executed.

The requirement that the memory access operations and the register updates be sequential produces a code which is not optimal in its execution. This disadvantage is also found in the code for the other Intel 486™ string operations noted above. In each case, a register value is not updated (incremented or decremented) and committed (the updated value is not assigned to a permanent variable) until the memory access operations are successfully completed.

This sub-optimal behavior is evident in the microcode for the REP MOVS instruction shown below:

| Code | Function |
|---|---|
| 1) OR CX, CX to check if CX = 0 | |
| 2) temp0 = memory [DS:SI]<br>temp1 = SI++ | read memory<br>increment SI but don't<br>commit value |
| if (CX ≠ 0) jump 4) | check if done |
| 3) End of instruction | |
| 4) memory [ES:DI] = temp0<br>DI++ | write memory<br>increment DI |
| 5) SI = temp1 | commit result of<br>incrementing SI |
| 6) CX—<br>jump to 2) | decrement CX |

The first microinstruction performs an ORing of the CX register with itself to set a flag if the CX register has the value of zero. The main loop of the code is contained in microinstructions 2, 4, 5, and 6. As evident from the code, the SI register is not updated (committed) until microinstruction (5), owing to the need to make the update dependent on the successful completion of the memory write instruction. Note that in instruction (2) above, the updated value for the SI register is assigned to a temporary variable (temp1). If the SI register were updated in instruction (2) (by committing the incremented value to the register) and a limit check exception occurred during execution of the memory write instruction (4), then the value of the SI register would be inconsistent because it would not correspond to the register value required for that iteration. Microinstruction (3) signifies the end of the REP MOVS instruction.

The described code for the REP MOVS instruction has a minimum execution time of 4n cycles (to execute microinstructions 2, 4, 5, and 6), assuming an ideal-memory. However, the optimal time for execution is 3n cycles, as would occur from executing the instruction by the steps of: (1) performing the read operation and updating the SI register; (2) performing the write operation and updating the DI register; and (3) decrementing the CX register.

There are two reasons why the optimal execution cycle cannot be accomplished by the code shown: 1) the incrementing of the SI register is not committed until it is known that the write instruction is successful, i.e., that it will not cause a limit check exception; and 2) a write operation following a read will typically involve at least a 1 clock cycle stall to allow time for the bus driver to be switched from a read mode to a write mode.

The table below shows the progression of the microcode through the processor pipeline for one iteration (A) of a REP MOVS instruction which is implemented according to the microcode shown above. The index (B) indicates the start of a second iteration. The first column contains the label of the pipeline stage (E for execute, W1 for write back 1, and W2 for write back 2). The subsequent columns show the cycle-by-cycle execution, where the executed statement is identified by (A)(n), where (A) represents the iteration and (n) represents the number of the microinstruction from the code shown previously.

| | Cycle | | | | | | | |
|---|---|---|---|---|---|---|---|---|
| Stage | 1 | 2 | 3 | 4 | 5 | 6 | 7 | 8 |
| E | A2 | A4 | A5 | A5 | A6 | B2 | | |
| W1 | | A2 | A4 | A4 | A5 | A6 | B2 | |
| W2 | | | A2 | A2 | A4 | A5 | A6 | B2 |

Even though only 4 microinstructions are executed, each iteration requires a minimum of 5 cycles because the read step requires two cycles in the W2 stage. In the best case situation, where a write instruction can be executed directly after a read instruction, the progression of the microcode through the pipeline is shown in the table below.

| | Cycle | | | | | | |
|---|---|---|---|---|---|---|---|
| Stage | 1 | 2 | 3 | 4 | 5 | 6 | 7 |
| E | A2 | A4 | A5 | A6 | B2 | | |
| W1 | | A2 | A4 | A5 | A6 | B2 | |
| W2 | | | A2 | A4 | A5 | A6 | B2 |

As indicated by the pipeline diagram above, the best execution time for the microcode is 4 cycles, although as mentioned, 5 cycles is more typical.

As evidenced by the pipeline tables, implementation of the MOVS instruction using the microcode shown is inefficient because it requires a greater number of cycles to execute than the number of core instructions. As noted, this is a direct result of structuring the code so that the updating and committing of the registers (SI, DI, and CX) occur after completion of the read and write operations. This structure is used in order to preserve the register values for an iteration in the event a limit exception or interrupt occurs during a read or write operation. Even though the code described is that for the MOVS instruction, the Intel 486™ microprocessor uses a similar structure for other string operations, so that the same inefficiency arises when implementing those operations.

What is desired is a method of carrying out string operations involving processing blocks of data within a memory in a more efficient manner than is currently used by many microprocessors for implementing such operations.

SUMMARY OF THE INVENTION

The present invention is directed to an efficient method for implementing string operations used to process blocks of data within a memory. This is accomplished by allowing the registers used to track the memory addresses to be incremented and committed prior to knowing whether a read and/or write address operation will generate an exception. In the event an exception occurs, exception handling hardware and microcode is used to restore the state of the registers used for the string operation to the condition they were in prior to the iteration which produced the exception.

This approach reduces the number clock cycles required to execute the string operation, producing a faster cycling of the code through multiple iterations. The result is a more optimal code for string operations and a decrease in the time required to carry out the string instruction.

Further objects and advantages of the present invention will become apparent from the following detailed description and accompanying drawings.

DETAILED DESCRIPTION OF THE PREFERRED EMBODIMENT

Figure 1:
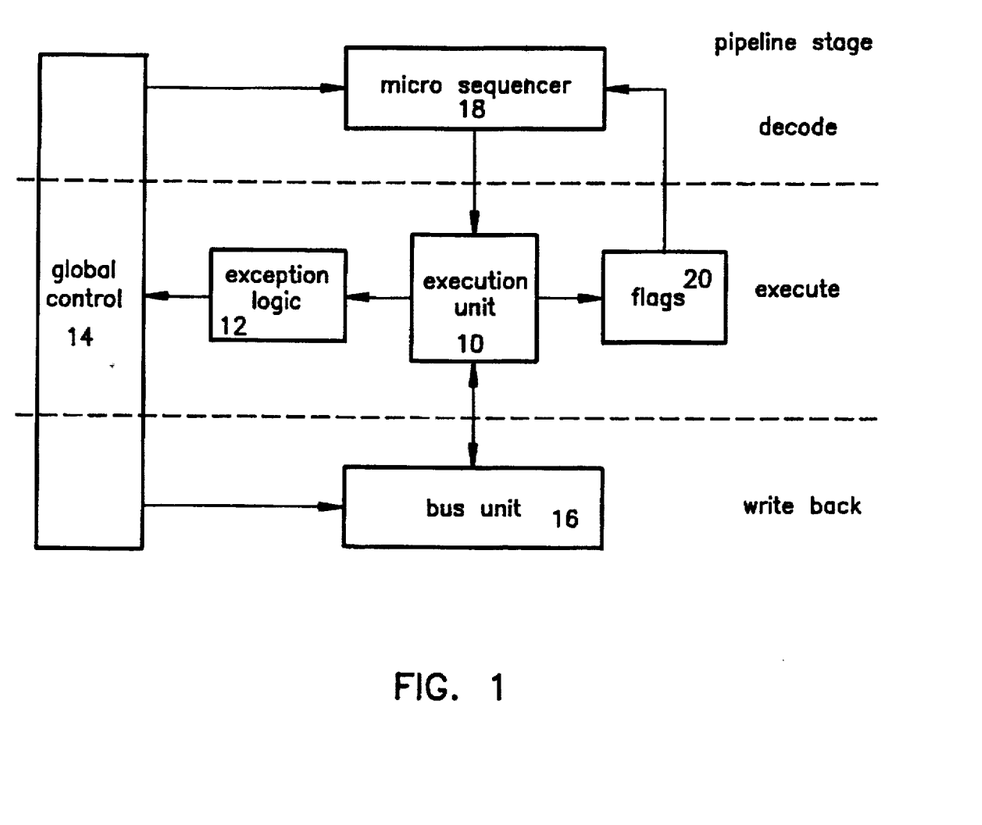
FIG. 1 is a block diagram of the processor components involved in executing a string instruction according to the method of the present invention.

FIG. 1 is a block diagram of the processor components involved in executing a string instruction according to the method of the present invention. In executing a string operation, execution unit 10 is responsible for calculating the address of the memory operands, checking for a limit exception and setting the flag(s) 20 indicating an inconsistent register. When a limit exception occurs, exception logic block 12 signals global control block 14. Global control block 14 then acts to terminate any memory operation in bus unit 16 and signals microsequencer 18 to begin executing the exception microcode. Microsequencer 18 reads flag(s) 20 to determine the inconsistent registers and acts to restore those registers to their appropriate values. The components shown in FIG. 1 are an example of those which can be used to practice the present invention and are not intended to represent a complete or necessary listing of such components.

According to the present invention, a more efficient (and hence faster) method of implementing a string operation in a manner compatible with an Intel 486™ microprocessor is obtained by incrementing and committing the register values used to determine the read and write addresses used in executing the string operation prior to executing the read and write operations. If a limit check exception occurs during a read or write operation, exception handling routine(s) are used to restore the registers to their values prior to the occurrence of the exception.

An example of a more optimal set of microcode for executing the MOVS string operation (MOVS 1) is shown below:

| Code (MOVS 1) | Function |
| --- | --- |
| 1) OR CX, CX to check if CX = 0 | |
| 2) temp0 = memory [DS:SI]<br>SI++ | read memory<br>increment SI, commit value, set SI flag inconsistent |
| if (CX ≠ 0 ), jump 4) | check if done |
| 3) SI—<br>End of instruction | restore SI value |
| 4) CX— | decrement CX, commit value, set CX flag inconsistent |
| 5) memory [ES:DI] = temp0<br>DI++<br>jump to 2) | write memory<br>increment DI, commit value, set SI, CX flags consistent |

In the above microcode, committing a register value means that the register value is incremented or decremented and assigned to the register and setting a register to be consistent or inconsistent means that a flag corresponding to that register is set in the indicated manner. In the above code, the main loop of the code which is responsible for the reading and writing to memory is now only three microinstructions, numbers 2, 4, and 5. This approach eliminates step 5 (SI =temp1) from the unoptimized code discussed previously by committing the value of SI in instruction 2. Since instruction 2 of this code (MOVS 1) usually requires two clock cycles in the W2 stage and the decrement of the CX register does not use the W2 stage, the decrement of CX has been moved so that this occurs in between the read from memory and write to memory stages. If an exception occurs during the write to memory stage (instruction 5), as would occur if the address calculation exceeds a segment limit, then the SI and CX registers will be in an inconsistent state because their values have been updated since the beginning of the iteration. Thus, when those registers are updated (instructions 2 and 4), a hardware flag is set which indicates that the values are inconsistent. In the event of an exception, the exception detection hardware and routine(s) are designed to check the flags and detect this inconsistency, and the exception microcode would then act to restore the values of the SI and CX registers.

The table below shows the progression of the optimized microcode through the processor pipeline for two iterations (A and B) of a MOVS instruction which is implemented according to the MOVS 1 microcode shown above.

| Stage | Cycle | | | | | | | |
| --- | --- | --- | --- | --- | --- | --- | --- | --- |
| | 1 | 2 | 3 | 4 | 5 | 6 | 7 | 8 |
| E | A2 | A4 | A5 | B2 | B4 | B5 | | |
| W1 | | A2 | A4 | A5 | B2 | B4 | B5 | |
| W2 | | | A2 | A2 | A5 | B2 | B2 | B5 |

As is apparent, the restructuring of the microcode has reduced the time required for execution from 5 cycles (or 4 for the case in which a write can immediately follow a read) to 3 cycles.

In order to implement the optimized microcode shown above, the exception handling routine(s) of the microprocessor need to be modified to restore the values of the SI and CX registers based on a limit check exception which results from a memory access using the address of DI. Note that if a limit check exception occurs with respect to the value of the SI register (during the read operation), then SI will not yet have been incremented, so that it is not necessary to restore the value of that register. In the event of a limit check exception, restoration of the value of the SI and CX registers can be accomplished by modifying the microprocessor code as follows:

(1) adding a flag which indicates that a register is in an inconsistent state and must be restored, and a microinstruction to set the flag(s). This can be implemented as a 1 bit register (a flip-flop). See flags block 20 in FIG. 1;

(2) the limit check exception and interrupt code must be updated to check the flag(s) and act to restore the inconsistent register values to their values at the start of the present iteration. This can be accomplished by code which tests to see if the register value is inconsistent, and if so, acts to either increment or decrement the value; and (3) the write to memory instruction should not disturb the hidden flags.

A variation (MOVS 2) of the optimized MOVS microcode that provides the same performance is shown below:

| Code (MOVS 2) | Function |
| --- | --- |
| 1) OR CX, CX to check if CX = 0 | |
| 2) temp0 = memory [DS:SI]<br>SI++ | read memory<br>increment SI, commit, |

| Code (MOVS 2) | Function |
|---|---|
| | set SI inconsistent |
| if (CX ≠ 0), jump 4) | check if done |
| 3) SI— | restore SI |
| End of instruction | |
| 4) memory [ES:DI] temp0 | write memory |
| DI++ | increment DI, commit, set SI, CX consistent |
| 5) CX— | decrement CX, commit, |
| jump to 2) | set CX inconsistent |

This variation is applicable when the read operation (instruction 2) can be performed in a single cycle. The difference between this version of the MOVS code (MOVS 2) and the previously discussed optimized MOVS code (MOVS 1) is that instructions 4 and 5 have been interchanged. This is permissible because instruction 2 requires only one cycle in the W2 stage, so that the decrement of the CX register doesn't need to be overlapped, and the write instruction can be executed immediately following the read instruction. If an exception occurs during the write to memory (instruction 4), only the SI register is in an inconsistent state and needs to be restored (by the SI—code in the exception microcode). This is in contrast to the MOVS 1 code, in which the SI and CX registers would have to be restored if an exception occurred during the write to memory step.

Another variation of the MOVS 1 code is based on the fact that in the original MOVS 1 optimized microcode, the CX register is decremented in instruction 4 and is checked for a zero value two instructions later, at instruction 2 of the next cycle. In some implementations of string operations, this checking will need to be performed in the instruction following the decrement operation. This is because in some machines, the microcode flags are set on every microinstruction. This means that if the CX register value is decremented in one micro-instruction, then the register value must be checked to see if it is zero in the next microinstruction. In the microcode shown below (MOVS 3), the same performance as in the optimized microcode (MOVS 1) is achieved in a situation where the checking of the CX register must be done in the step immediately after the decrement.

| Code (MOVS 3) | Function |
|---|---|
| 1) OR CX, CX to check if CX = 0 | |
| 2) temp0 ++memory [DS:SI] | read memory |
| SI++ | increment SI, commit, set SI inconsistent |
| if (CX ≠ 0), jump 5) | check if done |
| 3) SI— | restore SI |
| End of instruction | |
| 4) End of instruction | |
| 5) CX— | decrement CX, commit, set CX inconsistent |
| 6) memory [ES:DI] = temp0 | write memory |
| DI++ | increment DI, commit, set SI, CX consistent |
| if (CX = 0) jump to 4) | check if done |
| 7) temp0 = memory [DS:SI] | read memory |
| SI++ | Increment SI, commit, set SI inconsistent |
| jump 5) | |

The difference between the code shown above and the original optimized microcode (MOVS 1) is that the checking for the condition that CX equals zero is performed during the write to memory (instruction 6) rather than the read step. This rearrangement requires the use of additional microinstructions to set up the string operation, but the identical number of microinstructions to execute an iteration. If an exception occurs during the write step, both the SI and CX registers are in an inconsistent state and must be restored by means of the SI—and CX++ operations performed by the exception code.

In contrast to a machine for which the MOVS 3 microcode is designed, in a machine in which the microcode flags are not set on every micro-instruction, a zero value for the CX register can be checked for two or more microinstructions after CX is decremented. This provides greater flexibility in ordering the microinstructions and improving the execution speed of the code.

In accordance with the present invention, a method of reducing the number of clock cycles required for implementing a string operation has been disclosed. The method is based on structuring the microcode used to implement the operation such that the memory register values used during a cycle of the iterative operation are updated and committed concurrently with execution of the memory access operations which use the previously updated values. If an exception occurs, then the register values are in an inconsistent state. This state is recognized and resolved by exception handling logic. This method allows the registers to be updated concurrently with other operations, thereby reducing the number of clock cycles required to execute the string operation as compared to code structures in which the registers are updated and committed only after successful completion of the memory accesses.

The inventors of the present invention have also implemented the other string instructions shown in Table 1 in a more efficient manner by restructuring the order of the code. A brief description of the function of those instructions will now be presented, along with the corresponding optimized microcode.

The CMPS operation compares two blocks of memory and terminates when the first non-matching words are detected. In the standard Intel 486™ implementation, this instruction is prone to the same problem as found in the MOVS operation, i.e., the increment of the SI register is not committed until it is determined that the read from or write to memory steps do not cause an exception.

However, according to the present invention, the SI register is incremented, the CX register is decremented, and both registers are committed prior to the outcome of the read operation. Exception handling routines are again relied upon to restore the register values if a limit exception occurs as a result of the previous iteration's incrementing of the register. The method steps used to implement a CMPS string operation are shown below:

| Step | Function |
|---|---|
| 1) temp0 = memory [DS:SI] | read from source 1 |
| 2) temp1 = memory [ES:DI] | read from source 2 |
| 3) SI++ | move source pointer to next word |
| 4) DI++ | move destination pointer to next word |
| 5) CX— | decrement counter |
| 6) if temp0 ≠ temp1 then | check if done |
| end instruction | if done, end instruction |
| 7) if CX > 0 then | check if done |
| Go To 1) | if not done, continue |
| else | |
| end instruction | if done, end instruction |

In accordance with the present invention, an optimized code for executing a CMPS string operation is shown below:

| Code (CMPS) | Function |
| --- | --- |
| 1) OR CX, CX to check if CX = 0 | |
| 2) temp0 = memory [DS:SI] SI++ | read from memory increment SI value, commit, set SI inconsistent |
| if (CX = 0) jump 8) | check if done |
| 3) CX— | decrement CX value, commit, set CX inconsistent |
| 4) temp1 = memory [ES:DI] DI++ | read from memory increment DI value, commit, set SI, CX consistent |
| if (CX ≠ 0) jump 6) 5) End of instruction | check if done |
| 6) temp0 − temp1 | compare temp0 and temp1 |
| 7) temp0 = memory [DS:SI] SI++ | read from memory increment SI, commit, set SI inconsistent |
| if (temp0 = temp1) then jump to 3) | check if done |
| 8) SI— End of instruction | restore SI |

The main loop in the CMPS code is composed of microinstructions 3, 4, 6, and 7. The CX register value is decremented prior to the memory read operation and is therefore set inconsistent.

The SCAS instruction compares consecutive memory locations to the contents of the AX register until a non-matching location is encountered. The method steps used to implement a SCAS string operation are shown below:

| Step | Function |
| --- | --- |
| 1) temp0 = memory [ES:DI] | read from source |
| 2) DI++ | move source pointer to next word |
| 3) CX— | decrement counter |
| 4) if temp0 ≠ AX then end instruction | check if done if done, end instruction |
| 5) if CX > 0 then Go To 1) else end instruction | check if done if not done, continue if done, end instruction |

In accordance with the present invention, an optimized code for executing a SCAS string operation is shown below:

| Code (SCAS) | Function |
| --- | --- |
| 1) OR CX, CX to check if CX = 0 | |
| 2) CX— | decrement CX value, commit, set CX inconsistent |
| if (CX = 0) jump 5) | |
| 3) temp1 = memory [ES:DI] DI++ | read from memory increment DI value, commit, set CX consistent |
| if (CX ≠ 0) jump 5) 4) DI— End of instruction | check if done restore DI |
| 5) AX − temp1 | compare register AX and temp1 |
| 6) CX— | decrement CX value, commit, set CX inconsistent |

| Code (SCAS) | Function |
| --- | --- |
| if (AX = temp1) then jump to 3) 7) End of instruction | check if done |

The main loop in the SCAS code is composed of microinstructions 3, 5, and 6. The CX register value is decremented prior to the memory read operation and is therefore set inconsistent.

As with the other optimized codes which are designed in accordance with the present invention, the DI and CX registers are updated and committed (instructions 3 and 6) prior to the read operation which uses the register values to access the memory (instruction 3 of the next cycle). This structuring of the code improves the speed with which the instruction can be executed. The reduction in the number of clock cycles significantly improves the performance of the code.

The LODS instruction loads the AX register from memory. The method steps used to implement a LODS string operation are shown below:

| Step | Function |
| --- | --- |
| 1) AX = memory [DS:SI] | read from source |
| 2) SI++ | move source pointer to next word |
| 3) CX— | decrement counter |
| 4) if CX > 0 then Go To 1) | check if done if not done, continue else |
| end instruction | if done, end instruction |

In accordance with the present invention, an optimized code for executing a LODS string operation is shown below:

| Code (LODS) | Function |
| --- | --- |
| 1) OR CX, CX to check if CX = 0 | |
| 2) if (CX = 0) jump 5) | check if done |
| 3) CX— | decrement CX value, commit, set CX inconsistent |
| 4) AX = memory [DS:SI] | read from memory increment SI value, commit; set CX consistent |
| if (CX ≠ 0) jump 3) 5) SI++ End of instruction | check if done |

The main loop in the LODS code is composed of microinstructions 3 and 4. The CX register value is decremented prior to the memory read operation and is therefore set inconsistent.

In this optimized version of the LODS instruction, the SI and CX register values are committed (instructions 3 and 4) prior to the read operation which uses those values to access memory (instruction 4 of the next cycle). If a limit check exception occurs during the next iterative cycle, then the register values will be in an inconsistent state and will be corrected by the exception handling logic.

The STOS instruction stores the contents of the AX register in memory. The method steps used to implement a STOS string operation are shown below:

| Step | Function |
| --- | --- |
| 1) memory [ES:DI] = AX | write to memory |
| 2) DI++ | move destination pointer to next word |
| 3) CX-- | decrement counter |
| 4) if CX > 0 then Go To 1) else end instruction | check if done if not done, continue if done, end instruction |

In accordance with the present invention, an optimized code for executing a STOS string operation is shown below:

| Code (STOS) | Function |
| --- | --- |
| 1) OR CX, CX to check if CX = 0 | |
| 2) if (CX = 0) jump 5) | check if done |
| 3) CX-- | decrement CX value, commit, set CX inconsistent |
| 4) memory [ES:DI] = AX DI++ | write to memory increment DI value, commit, set CX consistent |
| if (CX ≠ 0) jump 3) 5) DI++ End of instruction | check if done |

The main loop in the STOS code is composed of microinstructions 3 and 4. The CX register value is decremented prior to the memory write operation and is therefore set inconsistent.

In this optimized version of the STOS instruction, the DI and CX register values are committed (instructions 3 and 4) prior to the write operation which uses the updated register values to access memory (instruction 4 of the next cycle).

Since the SCAS, LODS, and STOS operations access memory only a single time during each iteration, the improvement in speed of the optimized code is not as great as for the MOVS or CMPS optimized codes. However, as before, in an implementation in which the updates of the SI, DI, and CX registers are executed concurrently with or before the address calculation for the memory access, the registers can be committed early and the exception logic can be relied upon to restore the register value upon the occurrence of an exception.

Table 2 below shows the number of clock cycles required for performing (n) iterations of the indicated string operation for the ELentari microprocessor which incorporates the present invention and which is manufactured by National Semiconductor Corp., the assignee of the present application, the Intel 486™ microprocessor, and the Cyrix 486 microprocessor.

TABLE 2

| String Instruction | Elentari | Intel 486 ™ | Cyrix 486 |
| --- | --- | --- | --- |
| CMPS | 4n | 7n | 8n |
| LODS | 2n | 4n | 5n |
| MOVS | 3n | 3n | 4n |
| SCAS | 3n | 5n | 5n |
| STOS | 2n | 4n | 4n |

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08/451,965, entitled "SERIAL INTERFACE CAPABLE OF OPERATING IN TWO DIFFERENT SERIAL DATA TRANSFER MODES" (atty. docket no. NSC1-62800); U.S. patent application Ser. No. 08/453,076, entitled "HIGH PERFORMANCE MULTIFUNCTION DIRECT MEMORY ACCESS (DMA) CONTROLLER" (atty. docket no. NSC1-62900); U.S. patent application Ser. No. 08/452,001, entitled "OPEN DRAIN MULTI-SOURCE CLOCK GENERATOR HAVING MINIMUM PULSE WIDTH" (atty. docket no. NSC1-63000); U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451,924, entitled "EXECUTION UNIT ARCHITECTURE TO SUPPORT x86 INSTRUCTION SET AND x86 SEGMENTED ADDRESSING" (atty. docket no. NSC1-63300); U.S. patent application Ser. No. 08,451,444, [ALLOWED] entitled "BARREL SHIFTER" (atty. docket no. NSC1-63400); U.S. patent application Ser. No. 08/451,204, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195 [ALLOWED], entitled "DOUBLE PRECISION (64-BIT) SHIFT OPERATIONS USING A 32-BIT DATA PATH" (atty. docket no. NSC1-63600); U.S. patent application Ser. No. 08/451,571, entitled "METHOD FOR PERFORMING SIGNED DIVISION" (atty. docket no. NSC1-63700); U.S. patent application Ser. No. 08/452,162, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, entitled "AREA AND TIME EFFICIENT FIELD EXTRACTION CIRCUIT" (atty. docket no. NSC1-63900); U.S. patent application Ser. No. 08/451,535, [ALLOWED] entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100); U.S. patent application Ser. No. 08/450,153, [ISSUED: 08/13/96; PAT. NO. 5,546,353] entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" (atty. docket no. NSC1-64300); U.S. patent application Ser. No. 08/451,219, [ALLOWED] entitled "CIRCUIT FOR GENERATING A DEMAND-BASED GATED CLOCK" (atty. docket no. NSC1-64500); U.S. patent application Ser. No. 08/451,214 [ISSUED: 12/10/96, PAT. NO. 5,583,453], entitled "INCREMENTOR/DECREMENTOR" (atty. docket no. NSC1-64700); U.S. patent application Ser. No. 08/451,150, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451,198, entitled "CODE BREAKPOINT DECODER" (atty. docket no. NSC1-64900); U.S.

patent application Ser. No. 08/445,569, entitled "TWO TIER PREFETCH BUFFER STRUCTURE AND METHOD WITH BYPASS" (atty. docket no. NSC 1-65000); U.S. patent application Ser. No. 08/445,564, [ALLOWED], entitled "INSTRUCTION LIMIT CHECK FOR MICROPROCESSOR" (atty. docket no. NSC1-65100); U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452,080, entitled "APPARATUS AND METHOD FOR EFFICIENT COMPUTATION OF A 486™ MICROPROCESSOR COMPATIBLE POP INSTRUCTION" (atty. docket no. NSC1-65700); U.S. patent application Ser. No. 08/450,154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, [ABANDONED] entitled "DRAM CONTROLLER THAT REDUCES THE TIME REQUIRED TO PROCESS MEMORY REQUESTS" (atty. docket no. NSC1-66300); U.S. patent application Ser. No. 08/451,420, entitled "INTEGRATED PRIMARY BUS AND SECONDARY BUS CONTROLLER WITH REDUCED PIN COUNT" (atty. docket no. NSC1-66400); U.S. patent application Ser. No. 08/452,365, [ALLOWED] entitled "SUPPLY AND INTERFACE CONFIGURABLE INPUT/OUTPUT BUFFER" (atty. docket no. NSC1-66500); U.S. patent application Ser. No. 08/451,744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, entitled "CONFIGURABLE POWER MANAGEMENT SCHEME" (atty. docket no. NSC1-66700); U.S. patent application Ser. No. 08/452,350, entitled "BIDIRECTIONAL PARALLEL SIGNAL INTERFACE" (atty. docket no. NSC1-67000); U.S. patent application Ser. No. 08/452,094, entitled "LIQUID CRYSTAL DISPLAY (LCD) PROTECTION CIRCUIT" (atty. docket no. NSC1-67100); U.S. patent application Ser. No. 08/450,156, entitled "DISPLAY CONTROLLER CAPABLE OF ACCESSING GRAPHICS DATA FROM A SHARED SYSTEM MEMORY" (atty. docket no. NSC1-67500); U.S. patent application Ser. No. 08/450,726, [ISSUED: Jul. 30, 1996, PAT. NO. 5,541,935] entitled "INTEGRATED CIRCUIT WITH TEST SIGNAL BUSES AND TEST CONTROL CIRCUITS" (atty. docket no. NSC1-67600); and U.S. patent application Ser. no. 08/445,568, entitled "DECODE BLOCK TEST METHOD AND APPARATUS" (atty. docket no. NSC1-68000).

We claim:

1. A method of repetitively implementing a string operation to move a block of data from a first memory location to a second memory location, comprising:

reading a portion of the block of data from the first memory location;

updating and committing a value of a first register which indicates an address of a next portion of the block of data to be moved from the first memory location;

setting an indicator corresponding to the first register to indicate that the first register is in an inconsistent state;

writing the previously read portion of the block of data to a portion of the second memory location;

updating and committing a value of a second register which indicates an address of the second memory location to which the next portion of the block of data should be written;

setting an indicator corresponding to the second register to indicate that the second register is in an inconsistent state; and repeating the above steps of the method until the entire block of data has been moved from the first memory location to the second memory location, wherein if an exception occurs during the method steps, the method further comprises:

executing an exception handling routine which checks the state of the indicators corresponding to the first and second registers; and restoring the values of the first and second registers to values they had prior to the occurrence of the exception by appropriately incrementing or decrementing the register values if the registers are in an inconsistent state.

2. A method of repetitively implementing a string operation to compare a first block of data stored in a first memory location with a second block of data stored in a second memory location, comprising:

reading a portion of the first block of data from the first memory location;

updating and committing a value of a first register which indicates an address of a next portion of the first block of data to be read from the first memory location;

setting an indicator corresponding to the first register to indicate that the first register is in an inconsistent state;

reading a portion of the second block of data from the second memory location;

updating and committing a value of a second register which indicates an address of a next portion of the second block of data to be read from the second memory location;

setting an indicator corresponding to the second register to indicate that the second register is in an inconsistent state;

comparing the portion of the first block of data to the portion of the second block of data; and repeating the above steps of the method until the entire first and second blocks of data have been compared with each other, wherein the method steps are stopped when the portion of the first block of data is unequal to the portion of the second block of data, and further, wherein if an exception occurs during the method steps, the method further comprises:

executing an exception handling routine which checks the state of the indicators corresponding to the first and second registers; and restoring the values of the first and second registers to values they had prior to the occurrence of the exception by appropriately incrementing or decrementing the register values if the registers are in an inconsistent state.

3. A method of repetitively implementing a string operation to process a block of data stored in memory, comprising:

performing a data processing operation on a portion of the block of data;

updating and committing a register value of a register which indicates an address of a next portion of the block of data to be processed by performing the data processing operation on it;

setting an indicator corresponding to the register to indicate that the register is in an inconsistent state; and repeating the above steps of the method until the data processing operation has been performed on the entire block of data, wherein if an exception occurs during the method steps, the method further comprises:

executing an exception handling routine which checks the state of the indicator; and restoring the register value to a value it had prior to the occurrence of the exception by appropriately incrementing or decrementing the register value if the register is in an inconsistent state.

4. The method of claim 3, wherein the data processing operation is used to compare consecutive locations in a memory to the contents of a register.

5. The method of claim 3, wherein the data processing operation is used to load a register from a memory.

6. The method of claim 3, wherein the data processing operation is used to store a contents of a register in a memory.

7. The method of claim 3, wherein the data processing operation is used to compare a first block of data to a second block of data.

8. The method of claim 3, wherein the data processing operation is used to move a block of data from a first memory location to a second memory location.

* * * * *